United States Patent [19]

Okada

[11] Patent Number: 5,438,831

[45] Date of Patent: Aug. 8, 1995

[54] 331E1DRIVING APPARATUS

[75] Inventor: Hideaki Okada, Amagasaki, Japan

[73] Assignee: Kanzaki Kokyukoki Mfg. Co., Ltd., Hyogo, Japan

[21] Appl. No.: 126,189

[22] Filed: Sep. 24, 1993

[30] Foreign Application Priority Data

Sep. 30, 1992 [JP] Japan .................... 4-068059 U

[51] Int. Cl.6 ............... F16D 31/02; F16D 39/00
[52] U.S. Cl. ...................... 60/445; 60/487; 91/504
[58] Field of Search ............ 60/487, 460, 449, 452, 60/445; 91/504, 505

[56] References Cited

U.S. PATENT DOCUMENTS

| | | | |
|---|---|---|---|
| 4,496,289 | 1/1985 | Heiser et al. | 60/449 X |
| 4,655,689 | 4/1987 | Westveer et al. | 60/449 X |
| 5,048,293 | 9/1991 | Aoyagi | 60/420 |
| 5,094,077 | 3/1992 | Okada . | |
| 5,182,908 | 2/1993 | Devier et al. | 60/459 X |
| 5,203,169 | 4/1993 | Isii et al. | 91/505 X |

Primary Examiner—Edward K. Look
Assistant Examiner—Hoang Nguyen
Attorney, Agent, or Firm—Sterne, Kessler, Goldstein & Fox

[57] ABSTRACT

A pair of axles and a hydrostatic transmission which drives them are housed in a common housing. The hydrostatic transmission comprises a hydraulic pump, with a movable swash plate, which drives a hydraulic motor with pressurized oil. Adjusting the angle and direction of slant of the movable swash plate controls the volume and direction of flow of the pressurized oil. The angle and direction of slant of the movable swash plate are controlled by a rotating member and a shaft housed within the common housing. The rotating member has a contact portion which abuts against an abutting member when transmission is operating in reverse. When the abutting member abuts against the contact portion, a detector operates a switching unit, allowing an alarm to be sounded or the operating device of the vehicle to be disengaged automatically when the vehicle is running in reverse.

29 Claims, 6 Drawing Sheets

331E1DRIVING APPARATUS

BACKGROUND OF THE INVENTION

The present invention relates to a hydrostatic transmission for driving the axles of a working vehicle. The hydrostatic transmission is of the variable displacement type, and includes a means for detecting when the transmission is driving the vehicle backward.

PRIOR ART

The easily operated hydrostatic transmission is often used to drive the axles of a working vehicle, such as a lawn mower tractor. At least one of the displacement type hydraulic systems comprising the hydrostatic transmission includes a swash plate which can be moved in order to change the direction of the flow of the oil, and therefore the direction in which the axles of the vehicle are driven. As a result, the direction in which the vehicle travels can be selected by adjusting the direction in which the movable swash plate slants.

When the vehicle travels backward, it is desirable to sound an alarm to alert nearby persons. In addition, it is desirable to disengage any working device, such as a lawn mower blade, because it is usually not needed when the vehicle is moving backward. Typically, the worker disengages the working device when the vehicle is moving backward by using a clutch which operates independently of the mechanism which controls the direction of travel. However, if the worker forgets to do so, surrounding persons or property may be injured or damaged.

In some cases, this problem has been addressed by providing a detector, such as an electric switch, at a speed change lever or a link portion thereof in the vicinity of the driver's seat which detects when the working vehicle is moving backward. When the detector detects backward travel, an alarm buzzer automatically sounds, or a clutch disposed along the drive route for the operating device is electrically disengaged.

This conventional means of detecting backward motion has several disadvantages. The detector must be mounted to the speed change lever or link portion thereof at the driver's seat after the vehicle is assembled. This extra manufacturing step is very troublesome and decreases productivity. Mounting the detector requires additional labor and adjustment due to assembly imprecisions in the parts on which the detector is mounted. In addition, the detector is liable to be affected by rain water or the like, leading to problems with reliability and durability, and waterproofing the detector is expensive. The present invention has been designed to eliminate these disadvantages.

SUMMARY OF THE INVENTION

The present invention allows an alarm to be sounded or an operating device to be disengaged automatically when the vehicle is operating in reverse. The present invention comprises a hydrostatic transmission, which in turn comprises a pair of displacement type hydraulic systems fluidly connected with each other. The hydrostatic transmission drives a pair of axles which are housed in the same housing as the transmission. One of the hydraulic displacement systems has a movable swash plate. The angle and direction of slant of the movable swash plate controls the volume and direction of the pressurized fluid flowing between the hydraulic systems. The angle and direction of slant of the swash plate is controlled by an operating mechanism located within the housing, which has a rotating member fixed to a shaft. A detection means detects when the rotating member is rotated such that the swash plate is slanted to a position where the transmission operates in reverse.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
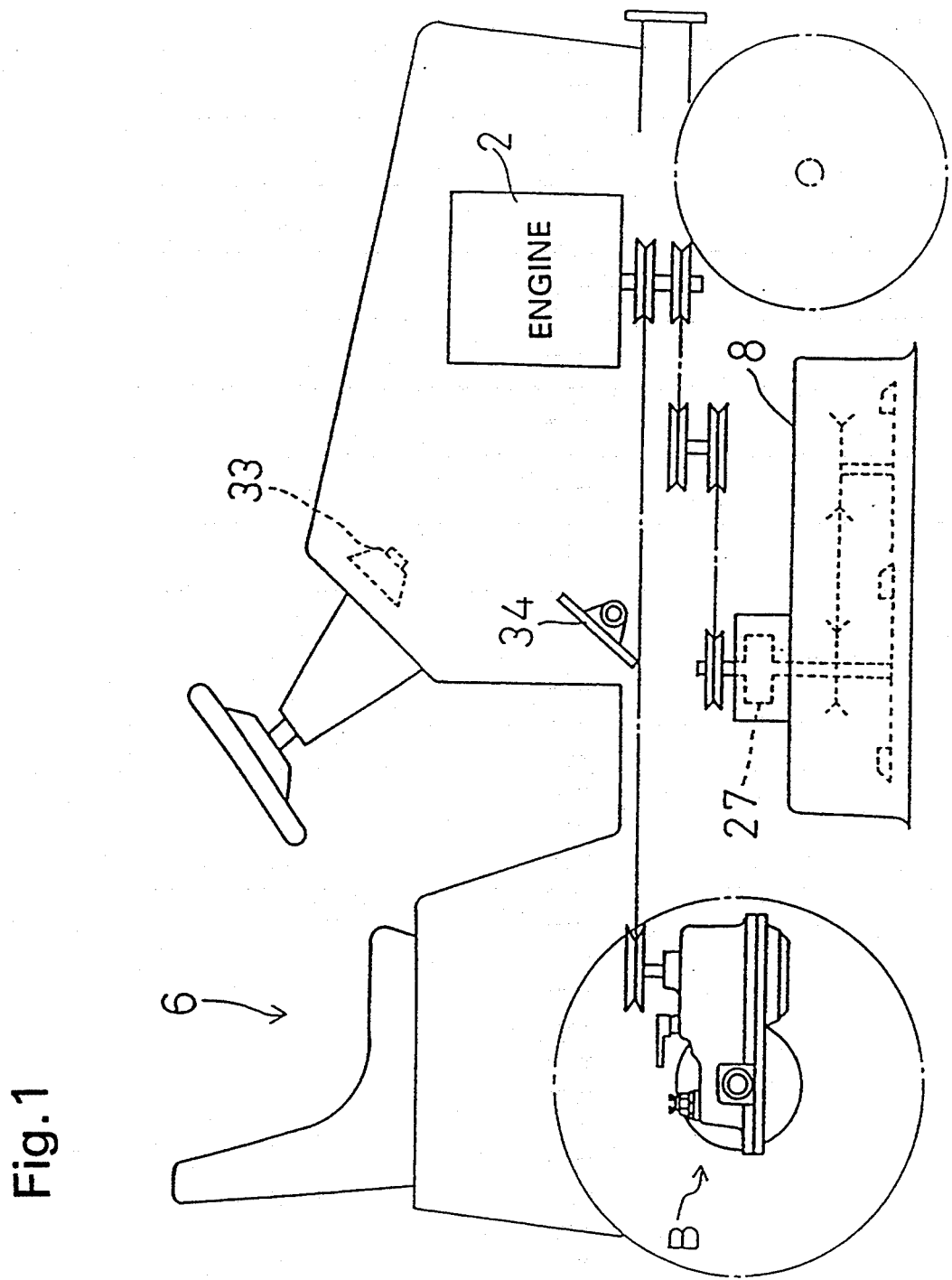
FIG. 1 is a side view of a mower equipped with an axle driving apparatus.

FIG. 1 shows a working vehicle equipped with a mower 8. An engine 2 is disposed at the front of the working vehicle, and an axle driving apparatus B is disposed at the rear. A driver's seat 6 is disposed above axle driving apparatus B. In the vicinity of driver's seat 6 are disposed a buzzer 33 for alerting nearby persons of danger, and a speed change operation unit 34 for changing the speed and direction of axle driving apparatus B. Axle driving apparatus B and mower 8 are driven by power from engine 2. An electromagnetic clutch 27 is disposed along the drive route to mower 8, so that mower 8 can be electrically engaged or disengaged.

Figure 2:
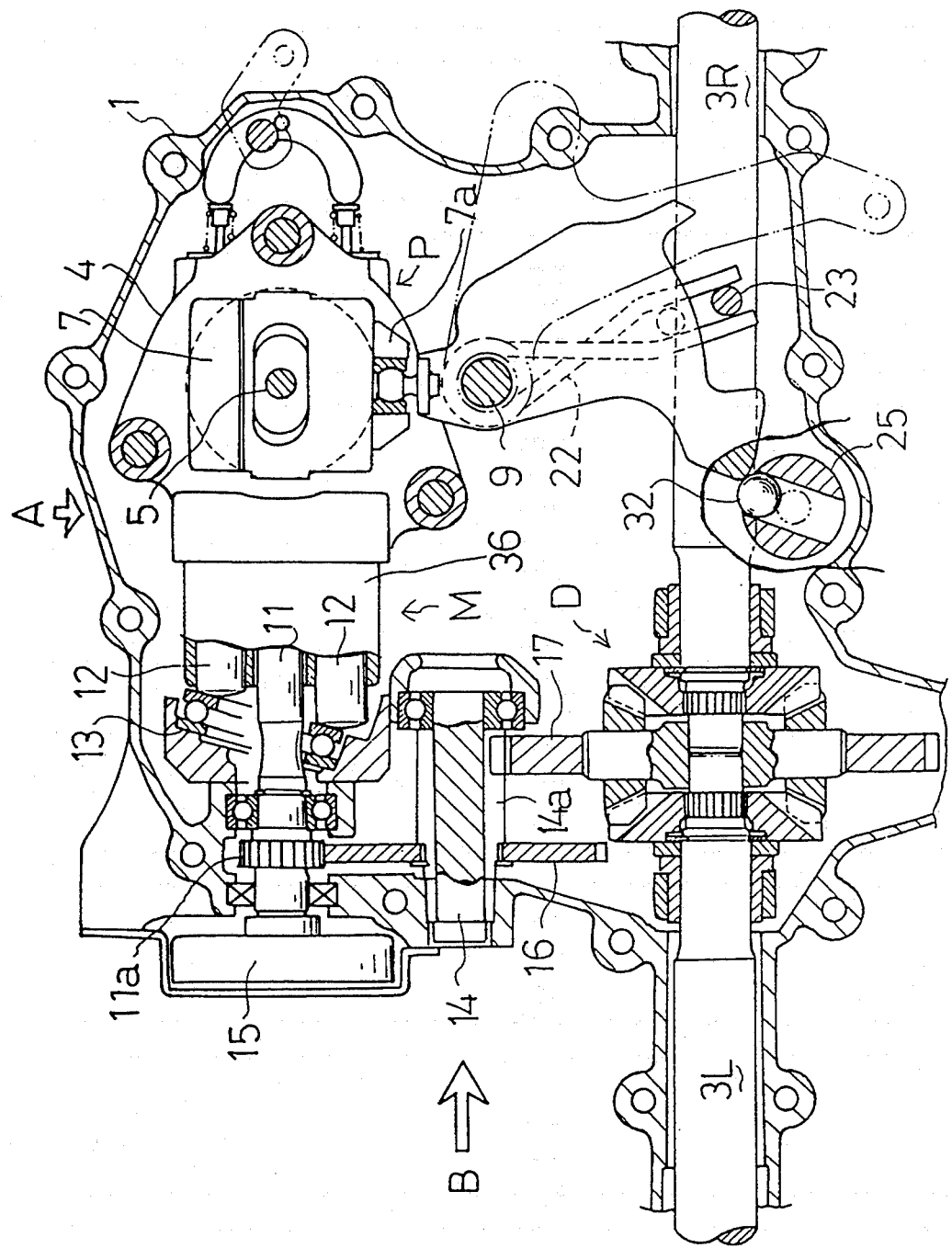
FIG. 2 is a cross sectional plan view of the axle driving apparatus equipped with a reverse position detection mechanism.
Figure 3:
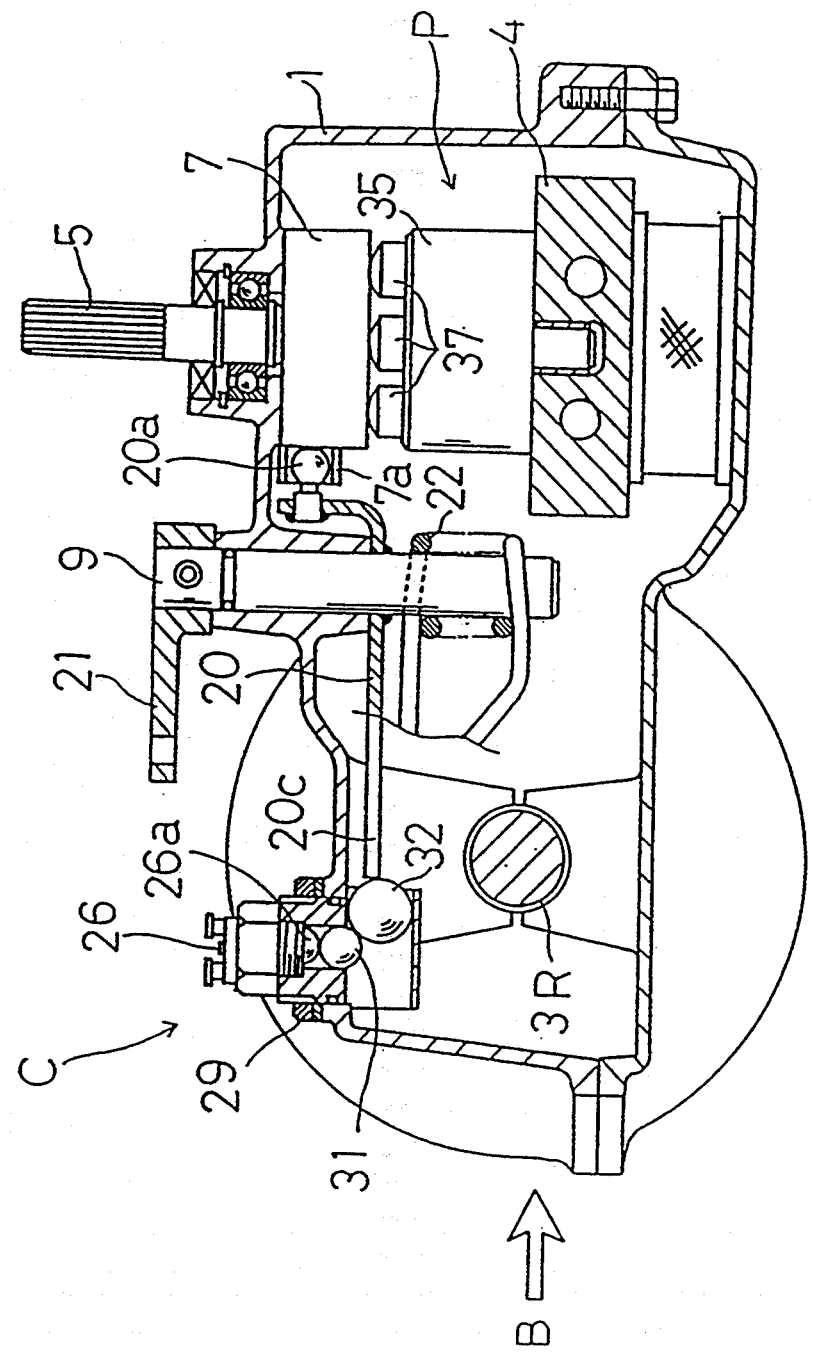
FIG. 3 is a cross sectional side view of the same.

FIGS. 2 and 3 show the internal construction of axle driving apparatus B. A housing 1, comprising upper and lower casings, houses and supports a hydrostatic transmission A, a differential gear D, and axles 3L and 3R. Hydrostatic transmission A comprises a hydraulic pump P, which is a variable displacement type hydraulic system, and a hydraulic motor M, both mounted on a generally L-shaped manifold 4. Power is transmitted from engine 2 to hydraulic pump P through an input shaft 5 mounted in the center of hydraulic pump P. A cylinder block 35 rotates with input shaft 5. A plurality of pistons 37, movable in reciprocation, are disposed within cylinder block 35. A movable swash plate 7 abuts against the heads of pistons 37.

Hydraulic motor M is a displacement type hydraulic system. A cylinder block 36 is mounted on, and rotates integrally with, an output shaft 11 which bridges manifold 4 and housing 1. Disposed within cylinder block 36 are a plurality of pistons 12 which abut at the heads against a fixed swash plate 13. Two oil paths (not shown) for fluidly connecting hydraulic pump P and hydraulic motor M with each other are disposed within manifold 4.

Engine 2 drives pump P by driving input shaft 5 and cylinder block 35 in rotation. Depending on the position of movable swash plate 7, this causes pistons 37 to drive pressurized oil down one or the other of the two oil paths within manifold 4. The position of movable swash plate 7 can be adjusted by rotating a shaft 9 as discussed below. The pressurized oil travels through the oil path to hydraulic motor M to push pistons 12. Because the heads of pistons 12 abut against fixed swash plate 13, this causes cylinder block 36 and output shaft 11 to rotate.

Input shaft 5 is always driven in the same direction by engine 2. When movable swash plate 7 is slanted to one side with respect to the axis of input shaft 5, output shaft 11 rotates in one direction, and when movable swash plate 7 is slanted to the other side, output shaft 11 rotates in the other direction. When movable swash plate 7 is slanted to a greater degree, the ratio of the rotation speed of output shaft 11 to that of input shaft 5 increases.

A brake drum 15 which can brake the rotation of output shaft 11 is fixed to the axial end thereof outside housing 1. A gear 11a is fixed to output shaft 11, and engages with a gear 16. Gear 16 is fixed to an intermediate shaft 14, which is rotatably mounted in housing 1. A gear 14a disposed on intermediate shaft 14 engages with a ring gear 17 disposed at differential gear D. As a result, the rotation of output shaft 11 is transmitted to ring gear 17, which drives axles 3L and 3R through bevel gears disposed in the differential gear D.

A rotating member 20 is fixed to a shaft 9, which is vertically rotatably mounted in housing 1. An engaging portion 20a projects from rotating member 20, and the spherical end of engaging portion 20a is inserted into an engaging socket 7a disposed in the side of movable swash plate 7. A speed change arm 21, disposed outside housing 1, is fixed to the end of shaft 9. Speed change arm 21 is operably connected to a speed change operation unit 34 disposed near driver's seat 6. Rotating member 20 and shaft 9 move together as a unit, referred to as the operating mechanism. When speed change operation unit 34 is rotated, shaft 9 and member 20 rotate, engaging portion 20a pushes engaging socket 7a, and the slant of movable swash plate 7 is adjusted.

Figure 4:
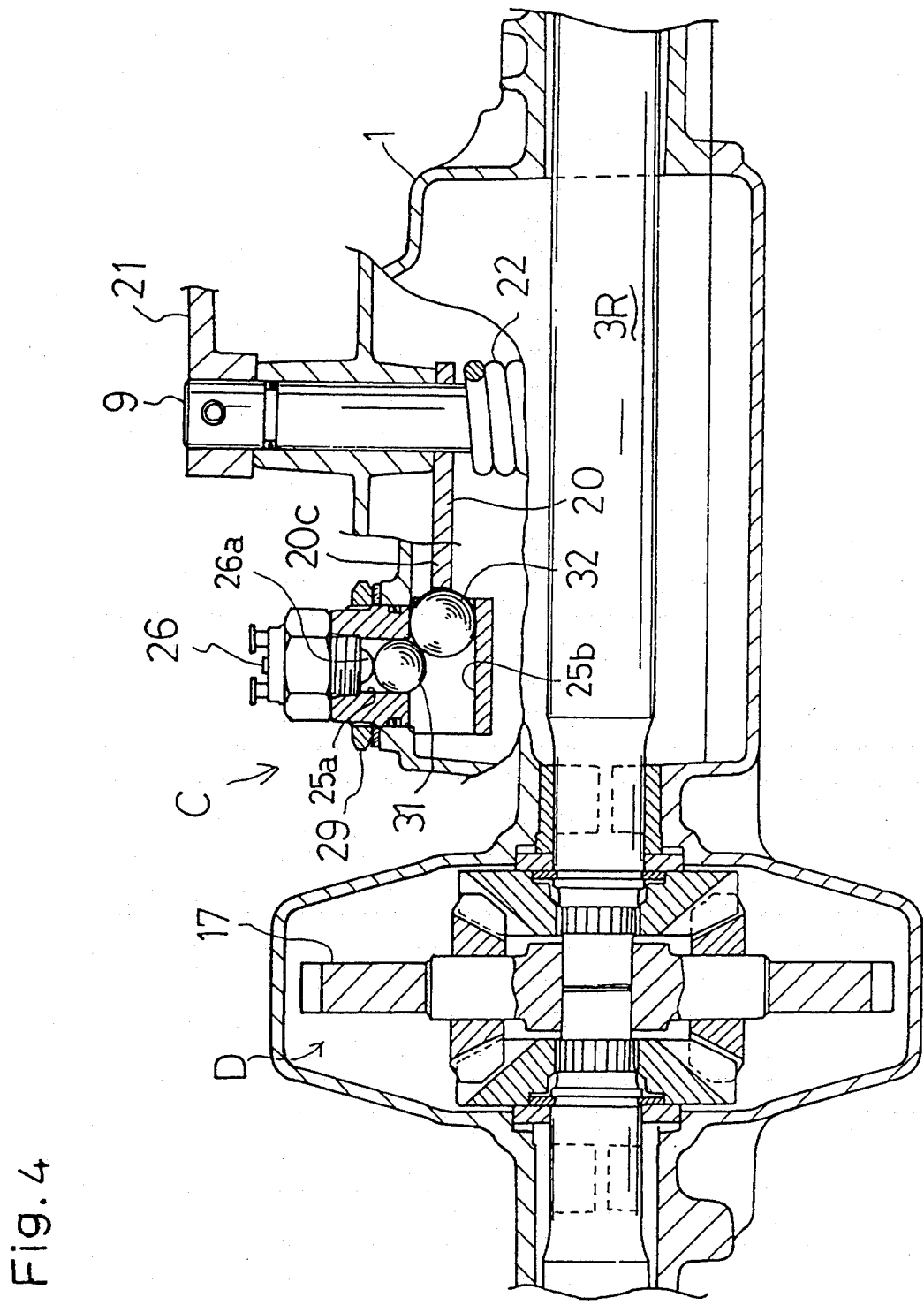
FIG. 4 is a cross sectional front view of the same.
Figure 5:
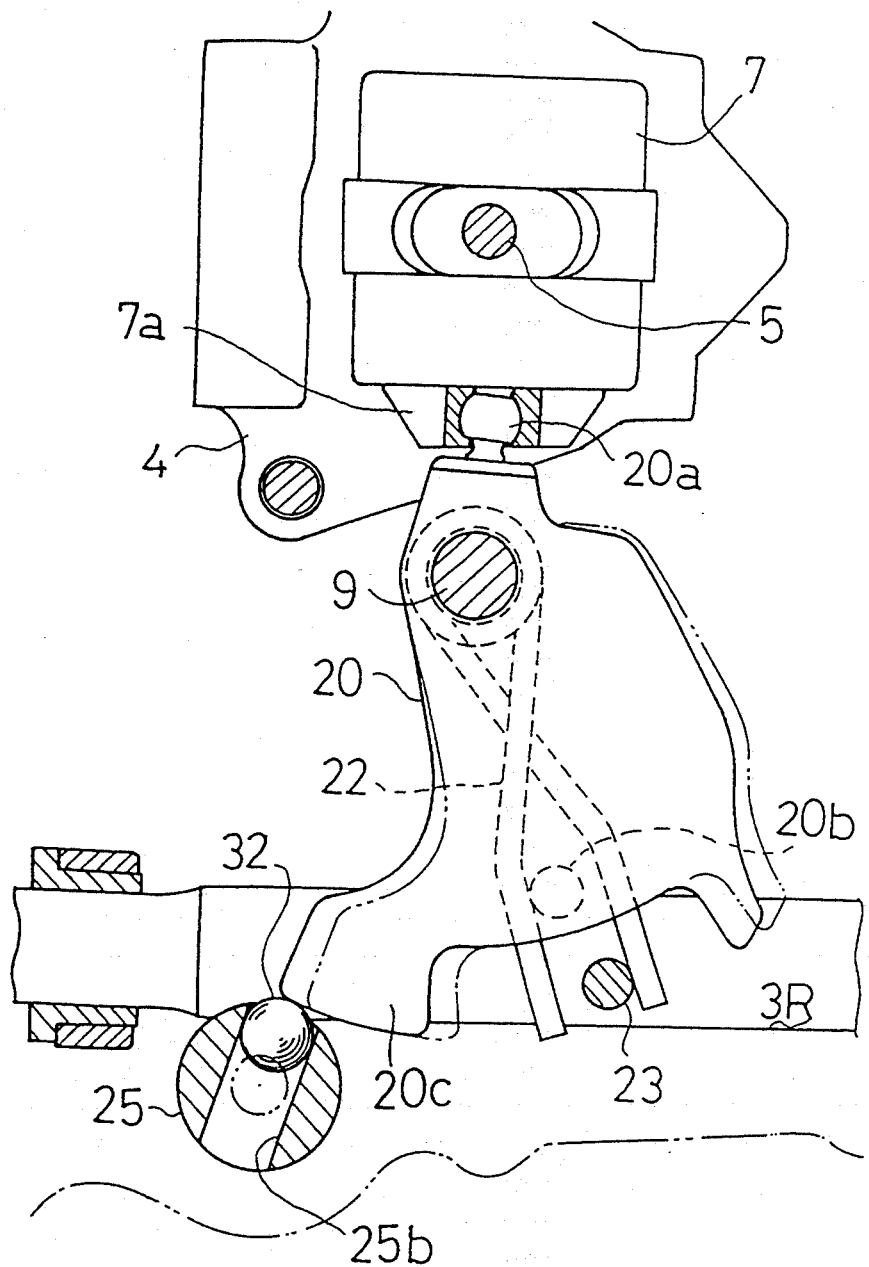
FIG. 5 is a plan view of the reverse rotation position detection unit.
Figure 6:
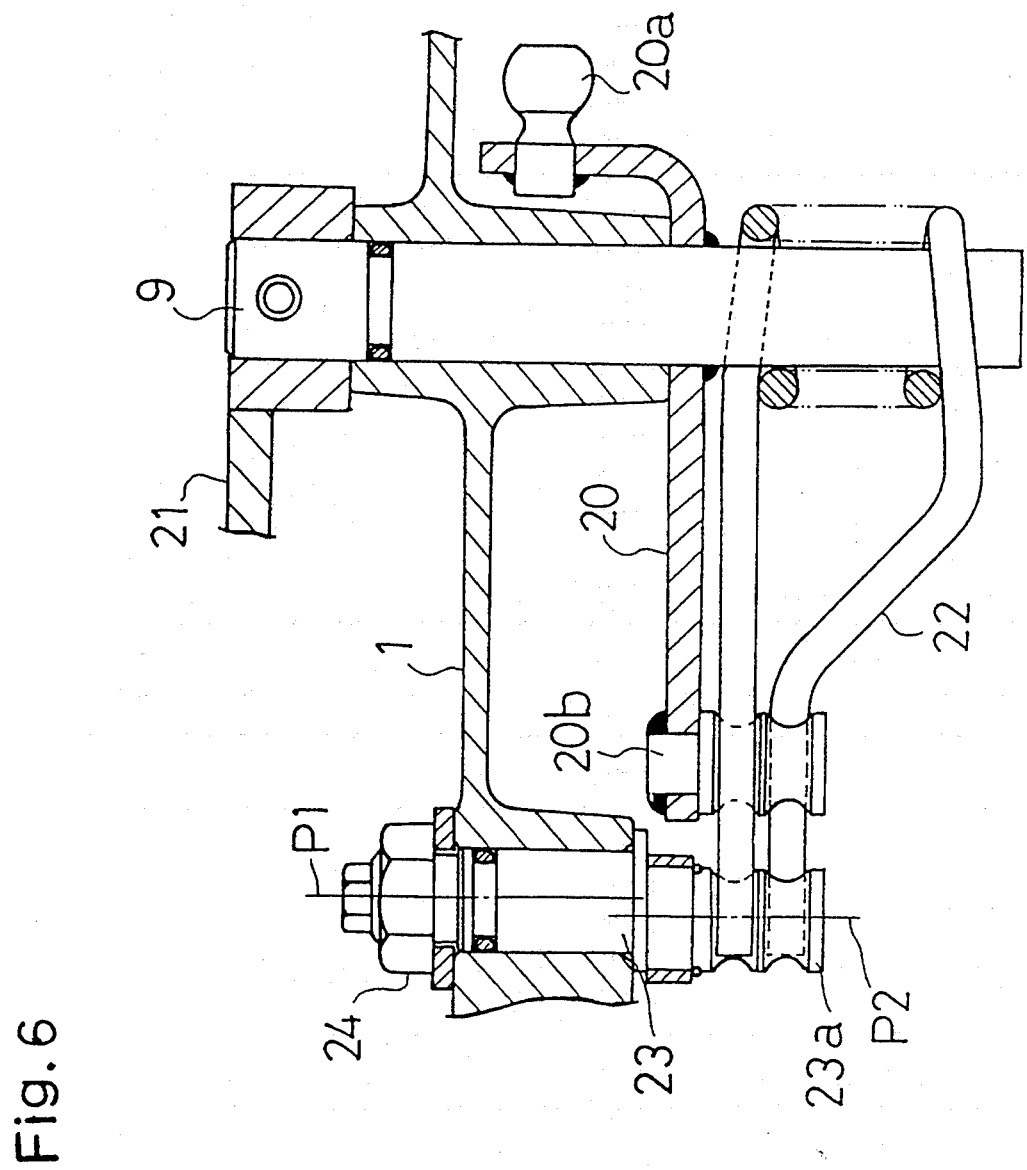
FIG. 6 is a cross sectional side view of a neutral position adjusting unit.

FIGS. 4, 5 and 6 detail the area around the shaft 9. A helical spring 22 is fitted onto shaft 9. Both ends of helical spring 22 extend sideways and cross each other. Sandwiched between the ends of spring 22 are a pin 20b which projects down from rotating member 20, and a neutral position adjusting pin 23 fixed to housing 1, such that the spring pushes the two pins together.

Referring now to FIG. 6, the lower axis P2 of neutral adjusting pin 23, onto which spring 22 is fitted, is eccentric to its upper axis P1, which is fixed to housing 1 by a nut 24. When nut 24 is loosened, neutral adjusting pin 23 can be rotated about upper axis P1, thereby changing the position of lower axis P2. As axis P2 of pin 23 moves, the force applied by spring 22 to shaft 9 and to rotating member 20 changes, causing rotating member 20 to rotate, and the degree of slant of movable swash plate 7 to change, whereby the neutral position of hydraulic pump P is adjusted.

Referring now to FIGS. 4 and 5, a contact portion 20c which projects from rotating member 20 is disposed to abut against detection means C, depending on the position of rotating member 20. Detection means C comprises a holding portion 25, intermediate member 31, abutting member 32, and switching unit 26. Holding portion 25 is mounted to the upper surface of housing 1 by screw threads and is substantially cylindrical shaped. The position of holding portion 25 can be adjusted by rotated about the axis of the cylinder, and the desired position is fixed by tightening a nut 29. The lower portion of holding portion 25 projects into housing 1, and is provided with an opening 25a and 25b shaped like an inverted T in cross section. A detachable switching unit 26 is disposed within an opening 25a, which forms a socket in the axial direction. An intermediate member 31, disposed in the lower portion of opening 25a, comprises a ball which can slide in the axial direction. Intermediate member 31 can abut against a detection element 26a disposed underneath switching unit 26.

An opening 25b, disposed in the lower portion of holding portion 25, opens horizontally, perpendicular to the rotation axis. Abutting member 32, comprising a ball, is disposed within opening 25b and can slide horizontally. The diameter of opening 25b along the circumference of holding portion 25 is smaller than that of abutting member 32 so as to prevent abutting member 32 from escaping from holding portion 25. Abutting member 32 is positioned eccentrically to the rotation axis of the holding portion 25. As a result, abutting member 32 projects horizontally from holding portion 25, and the direction of projection can be adjusted by rotating holding portion 25 so that abutting member 32 is positioned in the path of revolution of contact portion 20c of rotating member 20.

When abutting member 32 abuts against contact portion 20c of rotating member 20, it is pressed into holding portion 25. When the proper adjustments have been made, as described below, this occurs only when speed change operation unit 34 and movable swash plate 7 are positioned such that the vehicle is driven in reverse.

When speed change operation unit 34 is in the neutral position, it applies a bias to speed change arm 21. The equilibrium between this bias and the force applied to speed change arm 21 by spring 22 through rotating member 20 and shaft 9 determines the neutral position of speed change arm 21. When axle driving apparatus B is first assembled, it is unlikely that the neutral position of speed change arm 21 will cause movable swash plate 7 to be in a neutral position such that the hydraulic pump does not drive the motor, necessitating an adjustment. To effect such an adjustment, speed change operation unit 34 is fixed in the neutral position; nut 24 is loosened to allow the rotation of neutral position adjusting pin 23, which moves one end of spring 22, causing rotating member 20 to rotate through a force applied by the other end of spring 22 to pin 20b, and moves movable swash plate 7 through engaging portion 20a and socket 7a. Neutral adjusting pin 23 is rotated until movable swash plate 7 is in the neutral position, at which time nut 24 is tightened.

Speed change arm 21 is then turned from the neutral position to the point where reverse rotation of hydraulic motor M begins, nut 29 is loosened, holding portion 25 is rotated so that switching unit 26 switches at this point, and nut 29 is tightened.

Referring to FIG. 3, when speed change arm 21 is turned such that hydraulic motor M rotates in reverse, contact portion 20c of rotating member 20 presses abutting member 32 into holding portion 25, forcing intermediate member 31 upward. Intermediate member 31 pushes detection element 26a of switching unit 26, activating switching unit 26 when hydraulic motor M operates in reverse.

Switching unit 26 sounds an alarm buzzer 33 disposed on the vehicle, and/or disengages the operating device, such as mower 8, while the vehicle is traveling backward. For example, switching unit 26 can be built in a circuit of alarm buzzer 33. The electric contact of switching unit 26 closes during backward travel of the vehicle, automatically sounding alarm buzzer 33, alerting those around the vehicle.

Switching unit 26 can also be built in the electric circuit of electromagnetic clutch 27. In this situation, the electric contact of switching unit 26 is designed to be open during backward travel, automatically disengaging electromagnetic clutch 27 and temporarily disengaging the operating device during backward travel, making for a safer working environment.

The present invention integrates detection means C, which detects when movable swash plate 7 is slanted so as to drive the vehicle backward, within housing 1. Housing 1 also houses hydrostatic transmission A comprising a variable displacement type hydraulic pump P fluidly connected with displacement type hydraulic motor M, and/or the axles 3R and 3L coupled with the hydrostatic transmission A, thereby facilitating the assembly process of detection means C and facilitating working vehicle production. Another advantage of housing the detecting portion of detection means C within housing 1 is that it will not be affected by foreign objects such as rain water, and will maintain its reliability for a long time.

Detection means C detects when movable swash plate 7 is slanted so as to drive the vehicle in reverse by detecting the position of rotating member 20. This design minimizes the required parts for the detection means C, thereby minimizing manufacturing cost.

Detection means C comprises three basic parts: holding portion 25, abutting member 32 and switching unit 26. The integrated assembly of holding portion 25, abutting member 32, and switching unit 26 can be inserted into housing 1 and fixed in the proper position. The position of the assembly comprising detection means C is easily adjusted by rotating holding portion 25 with respect to housing 1, allowing the exact point at which reverse is detected to be adjusted to compensate for processing errors or assembly imprecisions in the movable swash plate 7 or its operating mechanism.

While preferred embodiments have been set forth, various modifications, alterations, and changes may be made without departing from the spirit and scope of the present invention as defined in the appended claims.

What is claimed is:

1. An axle driving apparatus comprising:
   a housing;
   a hydrostatic transmission disposed within said housing, including a variable displacement type hydraulic apparatus, and a movable swash plate having a variable direction of slant, whereby the movement of said movable swash plate controls the discharge direction of oil in said hydrostatic transmission and the volume of flow of oil in said hydrostatic transmission;
   an operating mechanism disposed within said housing for controlling the movement of said movable swash plate;
   a detection means for detecting when said operating mechanism moves said movable swash plate from a first slanting position to a second slanting position; and
   a switching unit operated by said detection means only when said detection means detects movement of said moveable swash plate to said the second slanting position.

2. An axle driving apparatus according to claim 1, wherein said operating mechanism comprises:
   a rotatable shaft;
   a rotating member fixed to said shaft and operably connected to said movable swash plate whereby when said shaft and said rotating member are rotated, the angle and direction of slant of said movable swash plate changes; and
   wherein said rotating member comprises a contact portion which interacts with said detection means, allowing said detection means to detect the direction of slant of said movable swash plate.

3. An axle driving apparatus according to claim 2, wherein said detection means comprises:
   an abutting member which is displaced by said contact portion of said rotating member when said movable swash plate is moved to said second slanting position; and
   a holding portion fixed to said housing for holding said abutting member,
   wherein said switching unit disposed at said holding portion for opening and closing an electric contact disposed therein according to displacement of said abutting member.

4. An axle driving apparatus according to claim 3, wherein:
   said contact portion of said rotating member and said abutting member of said detection means are disposed within said housing.

5. An axle driving apparatus according to claim 4, wherein:
   said switching unit is detachably mounted onto an end face of said holding portion which is exterior to said housing.

6. An axle driving apparatus according to claim 4, wherein:
   said rotating member is operably connected to said movable swash plate by an engaging portion of said rotating member.

7. An axle driving apparatus according to claim 3, wherein:
   said holding portion of said detection means is substantially cylindrical shaped and is fixed to said housing so as to be rotatably adjusted about a longitudinal axis of said holding portion; and
   said abutting member of said detection means is disposed in an eccentric position from the rotation axis of said holding portion.

8. An axle driving apparatus according to claim 7, wherein:
   said holding portion is disposed along a rotary path of said rotating member; and
   said longitudinal axis of said holding portion is approximately parallel to an axis of rotation of said rotating member.

9. An axle driving apparatus according to claim 7, wherein:
   said abutting member partially projects from a first opening in an outer peripheral surface of said holding portion.

10. An axle driving apparatus according to claim 9, wherein:
    said holding portion comprises a substantially right-angled passage connecting a second opening disposed at an end face of said holding portion with said first opening;
    said switching unit is disposed in said second opening and mounted to the end face of said holding portion; and
    said abutting member and a detection element of said switching unit abut against each other directly within said substantially right-angled passage of said holding portion.

11. An axle driving apparatus according to claim 9, wherein:
said holding portion comprises a substantially right-angled passage connecting a second opening disposed at an end face of said holding portion with said first opening;
said switching unit is disposed in said second opening and mounted to the end face of said holding portion; and
said abutting member and said detection element of a switching unit abut against each other through an intermediate member within said substantially right-angled passage of said holding portion.

12. An axle driving apparatus according to claim 1, wherein said switching unit activates an alarm attached to a vehicle with said axle driving apparatus.

13. An axle driving apparatus according to claim 1, wherein said switching unit disengages an operating device attached to a vehicle with said axle driving apparatus.

14. An axle driving apparatus according to claim 1, wherein said hydrostatic transmission comprises a pair of displacement type hydraulic systems fluidly connected to each other, one of said pair of displacement type hydraulic systems being said variable displacement type hydraulic apparatus.

15. An axle driving apparatus according to claim 1, further comprising:
a pair of axles driven by said hydrostatic transmission.

16. An axle driving apparatus comprising:
a housing;
a hydrostatic transmission disposed within said housing, including a variable displacement type hydraulic apparatus, and a movable swash plate having a variable direction or slant, whereby the movement of said movable swash plate controls the discharge direction of oil in said hydraulic transmission and the volume of flow of oil in said hydrostatic transmission; and
an operating mechanism disposed within said housing for controlling the movement of said movable swash plate, and a detection means for detecting when said operating mechanism moves said movable swash plate, said operating mechanism comprising,
a rotatable shaft,
a rotating member fixed to said shaft and operably connected to said movable swash plate whereby when said shaft and said rotating member are rotated, said movable swash plate moves from one slanting position to another slanting position, and
wherein said rotating member comprises a contact portion which interacts with said detection means, allowing said detection means to detect a slanting position of said movable swash plate.

17. An axle driving apparatus according to claim 15, wherein said detection means comprises:
an abutting member which is displaced by said contact portion of said rotating member when said movable swash plate is moved to said another slanting position;
a holding portion fixed to said housing for holding said abutting member; and
a switching unit disposed at said holding portion for opening and closing an electric contact disposed therein according to displacement of said abutting member.

18. An axle driving apparatus according to claim 17, wherein:
said contact portion of said rotating member and said abutting member of said detection means are disposed within said housing.

19. An axle driving apparatus according to claim 18, wherein:
said switching unit is detachably mounted onto an end face of said holding portion which is exterior to said housing.

20. An axle driving apparatus according to claim 18, wherein:
said rotating member is operably connected to said movable swash plate by an engaging portion of said rotating member.

21. An axle driving apparatus according to claim 17, wherein:
said holding portion of said detection means is substantially cylindrical shaped and is fixed to said housing so as to be rotatably adjusted about a longitudinal axis of said holding portion; and
said abutting member of said detection means is disposed in an eccentric position from the rotation axis of said holding portion.

22. An axle driving apparatus according to claim 21, wherein:
said holding portion is disposed along a rotary path of said rotating member; and
said longitudinal axis of said holding portion is approximately parallel to an axis of rotation of said rotating member.

23. An axle driving apparatus according to claim 21, wherein:
said abutting member partially projects from a first opening in an outer peripheral surface of said holding portion.

24. An axle driving apparatus according to claim 23, wherein:
said holding portion comprises a substantially right-angled passage connecting a second opening disposed at an end face of said holding portion with said first opening;
said switching unit is disposed in said second opening and mounted to the end face of said holding portion; and
said abutting member and a detection element of said switching unit abut against each other directly within said substantially right-angled passage of said holding portion.

25. An axle driving apparatus according to claim 23, wherein:
said holding portion comprises a substantially right-angled passage connecting a second opening disposed at an end face of said holding portion with said first opening;
said switching unit is disposed in said second opening and mounted to the end face of said holding portion; and
said abutting member and a detection element of said switching unit abut against each other through an intermediate member within said substantially right-angled passage of said holding portion.

26. An axle driving apparatus according to claim 23, wherein said pair of axles are disposed within said housing.

27. An axle driving apparatus according to claim 16, wherein said hydrostatic transmission comprises a pair of displacement type hydraulic systems fluidly connected to each other, one of said pair of displacement type hydraulic systems being said variable displacement type hydraulic apparatus.

28. An axle driving apparatus according to claim 16, further comprising:
 a pair of axles driving by said hydrostatic transmission.

29. An axle driving apparatus according to claim 28 wherein said pair of axles are disposed within said housing.

* * * * *

UNITED STATES PATENT AND TRADEMARK OFFICE
CERTIFICATE OF CORRECTION

PATENT NO. : 5,438,831

DATED : August 8, 1995

INVENTOR(S) : Hideaki Okada

It is certified that error appears in the above-identified patent and that said Letters Patent is hereby corrected as shown below:

On the title page, item [54]:

In the title of the invention, please change "331E1DRIVING" to -- AXLE DRIVING--.

In claim 1 at column 5, lines 64 and 65, please change "said the second" to --said second--.

In claim 17 at column 7, line 59, please change "15" to --16--.

Signed and Sealed this

Seventh Day of November, 1995

*Attest:*

BRUCE LEHMAN

*Attesting Officer*  *Commissioner of Patents and Trademarks*